United States Patent [19]

Miller et al.

[11] Patent Number: 5,190,370
[45] Date of Patent: Mar. 2, 1993

[54] HIGH ASPECT RATIO LIGHTING ELEMENT

[75] Inventors: Richard A. Miller, Stillwater; Kenneth A. Aho, Chisago City; Sanford Cobb, Jr., St. Mary's, all of Minn.

[73] Assignee: Minnesota Mining and Manufacturing Company, St. Paul, Minn.

[21] Appl. No.: 748,030

[22] Filed: Aug. 21, 1991

[51] Int. Cl.⁵ ............................ F21V 5/02
[52] U.S. Cl. ...................... 362/340; 362/268; 362/31
[58] Field of Search .......... 362/31, 237, 244, 268, 362/309, 340, 339

[56] References Cited

U.S. PATENT DOCUMENTS

| | | | |
|---|---|---|---|
| 1,245,836 | 11/1917 | Waggoner | 240/11.4 |
| 1,944,154 | 1/1934 | Dickson | 362/340 |
| 2,050,429 | 8/1936 | Dorey et al. | 240/106 |
| 2,818,500 | 12/1957 | Franck | 240/106 |
| 2,831,394 | 4/1958 | Heenan et al. | 362/340 |
| 3,049,616 | 8/1962 | Davis | 240/106 |
| 3,179,796 | 4/1965 | Rolph | 240/106 |
| 3,383,676 | 5/1968 | Nagel | 359/622 |
| 3,539,799 | 11/1970 | Dangauthier | 240/41.35 |
| 3,716,710 | 2/1973 | Clostermann et al. | 240/106 R |
| 3,740,119 | 6/1973 | Sakurai et al. | 350/167 |
| 3,764,800 | 10/1973 | Clostermann | 240/106 R |
| 4,118,763 | 10/1978 | Osteen | 362/339 |
| 4,177,505 | 12/1979 | Carel | 362/309 |
| 4,411,493 | 10/1983 | Miller | 350/262 |
| 4,451,875 | 5/1984 | Odle et al. | 362/340 |
| 4,497,860 | 2/1985 | Brady | 428/156 |
| 4,498,733 | 2/1985 | Flanagan | 350/102 |
| 4,530,041 | 7/1985 | Yamai et al. | 362/268 |
| 4,799,137 | 1/1989 | Aho | 362/309 |
| 4,805,984 | 2/1989 | Cobb, Jr. | 350/96.28 |
| 4,874,228 | 10/1989 | Aho et al. | 350/345 |
| 4,984,144 | 1/1991 | Cobb, Jr. et al. | 362/31 |
| 5,040,878 | 8/1991 | Eichenlaub | 362/31 |
| 5,054,885 | 10/1991 | Melby | 359/618 |
| 5,064,276 | 11/1991 | Endo et al. | 362/31 |
| 5,078,675 | 1/1992 | Nakayama | 362/31 |

FOREIGN PATENT DOCUMENTS

| | | |
|---|---|---|
| 694291 | 7/1940 | Fed. Rep. of Germany . |
| 16675 | 5/1955 | Fed. Rep. of Germany . |
| 1125856 | 3/1962 | Fed. Rep. of Germany . |
| 1835318 | 3/1962 | Fed. Rep. of Germany . |
| 2750828 | 5/1979 | Fed. Rep. of Germany . |
| 8034379 | 4/1982 | Fed. Rep. of Germany . |
| 1021159 | 3/1966 | United Kingdom . |

Primary Examiner—Richard R. Cole
Attorney, Agent, or Firm—Gary L. Griswold; Walter N. Kirn

[57] ABSTRACT

A lighting element has a light source positioned so as to provide a beam of light at a grazing angle to a light extractor. The extractor has a plurality linear triangular prism on the side struck by the beam of light. The prisms lie in a smooth arcuate curve.

6 Claims, 2 Drawing Sheets

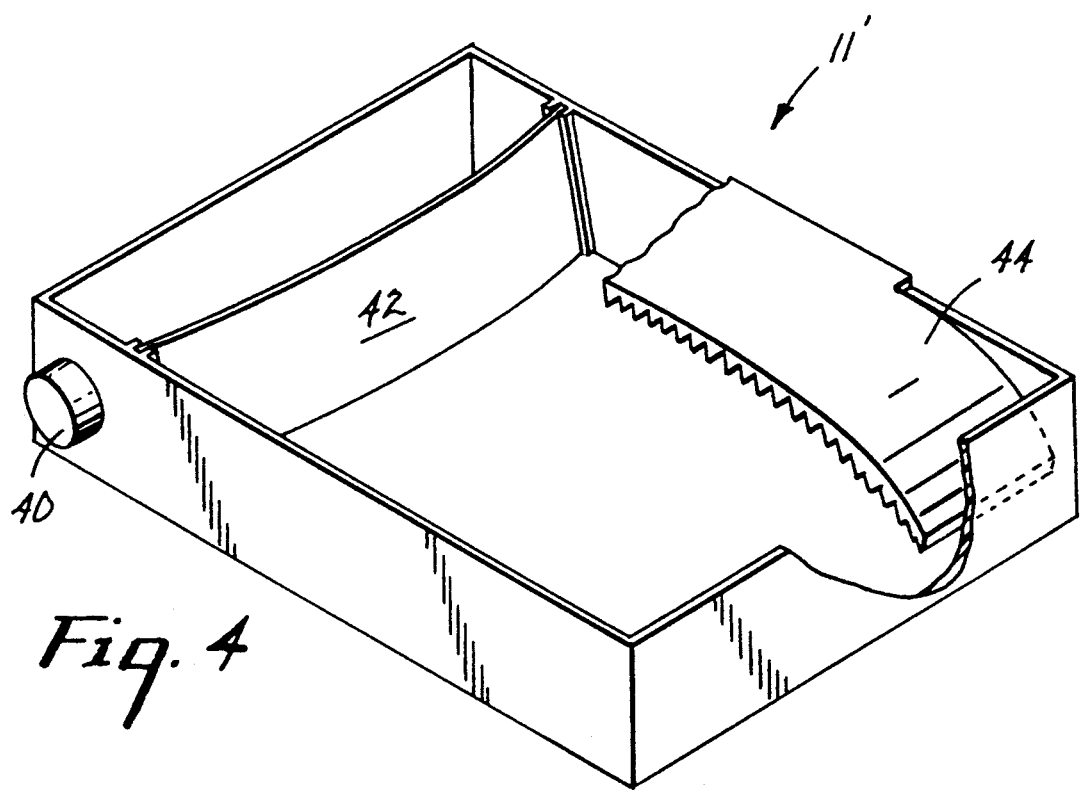
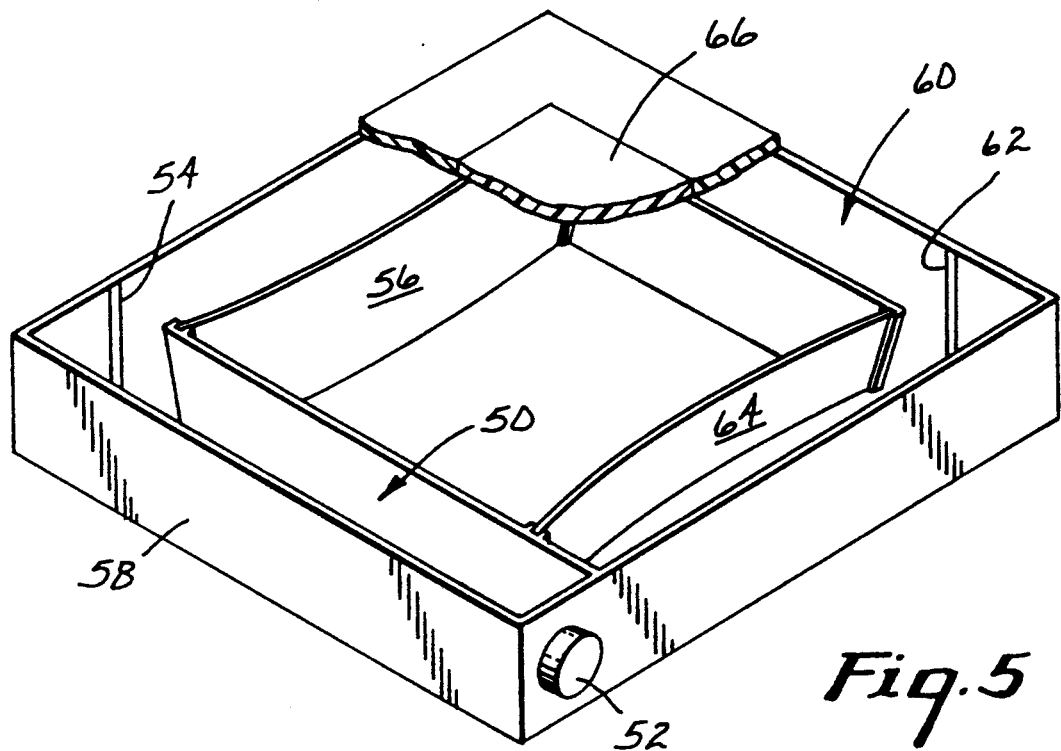

HIGH ASPECT RATIO LIGHTING ELEMENT

TECHNICAL FIELD

The present invention relates to light fixtures and more particularly to light fixtures having a very high aspect ratio of the type disclosed in U.S. Pat. No. 4,984,144, the disclosure of which is incorporated herein by reference.

BACKGROUND OF THE INVENTION

In some applications lighting elements having high aspect ratios, i.e., having length and width which are much greater than their thickness, are desirable. For example, automotive taillights are preferably designed to be as thin as possible because volume required for such space typically comes at the expense of luggage area. Similarly, the lighting elements used in the displays of laptop computers should be as thin as possible to minimize both size and weight.

One approach to producing such high aspect ratio lighting elements is described in commonly assigned U.S. Pat. No. 4,984,144, filed Feb. 20, 1987, and issued Jan. 8, 1991. According to one embodiment of the invention of that patent, a lighting element uses a light extraction film having a smooth side and a structured side. The structured side has formed thereon isosceles prisms with included angles in the range of 59 to 79 degrees. These included angles are selected because they provide a preferred range of angles in the output light beam.

A limitation of the lighting element shown in FIG. 1 of U.S. Pat. No. 4,984,144 arises from the fact that even nominally collimated beams of light actually will either converge or diverge. Most light sources will produce beams that are slightly convergent. It should be noted, however, that a convergent beam will reach a minimum diameter and then begin to diverge. Effectively, therefore, virtually all typical sources will produce divergent beams. Thus if the smooth surface of the extractor lies in a plane, as shown in that figure, the light beam will strike different portions of the extractor film at different angles. This variation of angularity will be carried into the output beam. This can be a problem in some displays, particularly those utilizing stacked elements. Another related problem arises from the fact that the light intensity falling on the extractor generally will decrease with increasing distance from the light source. This results in nonuniform light output over the optical window.

SUMMARY OF THE INVENTION

According to the present invention a lighting element has a housing defining an optical window. A light extractor film having a plurality of triangular, linear prisms is used to extract light from the interior of the housing. The prisms form a smooth arcuate curve. A light source is positioned to direct a beam of light toward the prisms at a grazing angle such that light will enter one facet of a prism, be totally internally reflected by the second facet and emerge from the extractor film through the other side thereof.

BRIEF DESCRIPTION OF THE DRAWINGS

FIG. 4 is a drawing of a light fixture utilizing two lighting elements according to the invention; and FIG. 5 is a drawing of a light fixture utilizing three lighting elements according to the present invention.

DETAILED DESCRIPTION

Figure 1:
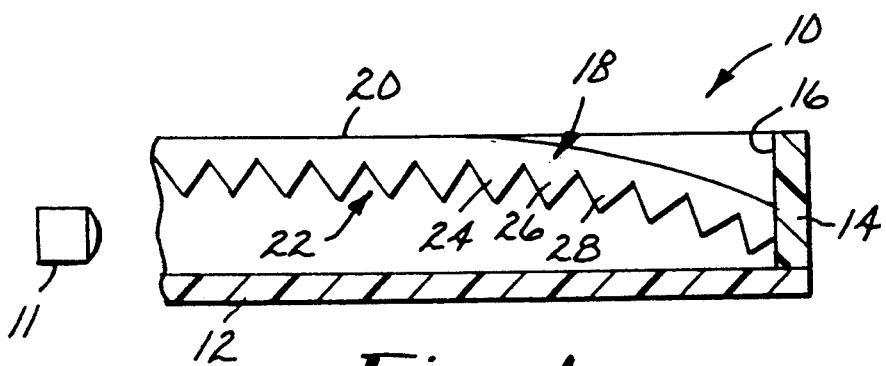
FIG. 1 is a schematic cross sectional view of a first lighting element according to the invention.

One lighting element of the present invention, designated generally as 10, is shown in FIG. 1. Light fixture 10 includes light source 11 and sides 12 and 14. Light source 11 may be a simple source consisting of a point source such as a lamp and a paraboloidal reflector, or may be itself a lighting element according to the invention, as will be discussed below. Sides 12 and 14, along with other sides, not shown, form an enclosure having an optical window 16. A light extraction film 18 causes light to be extracted from the enclosure. Light source 11 emits a collimated beam of light in a direction such that the light strikes film 18 at a small angle with respect to a tangent to the film. This is sometimes known as a grazing angle. Light extractor film 18 has an outer surface 20 that may be smooth and a structured surface 22. Structured surface 22 has thereon a plurality of linear prisms such as prisms 24, 26, and 28 facing the interior of the enclosure. The axes of prisms 24, 26, and 28 run perpendicular to the direction of light coming from light source 11. In one embodiment side 14 is made reflective by using a mirror or a reflective tape such as that sold under the trade name "Silverlux" by Minnesota Mining and Manufacturing Company.

Because of the prisms, structured surface 22 is not smooth. However, the prisms themselves may be said to lie in a smooth arcuate curve.

Figure 2:
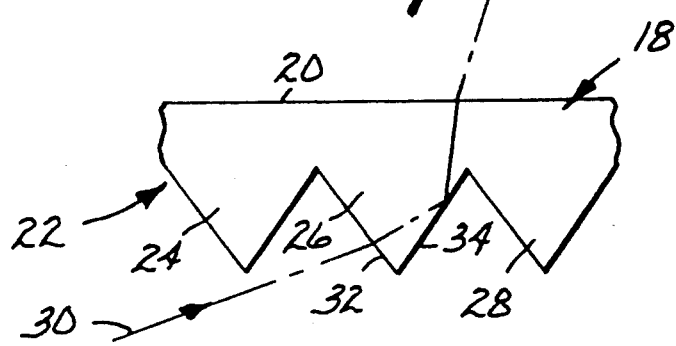
FIG. 2 is an expanded view of a light extractor for use with the invention.

FIG. 2 shows an enlargement of a portion of film 18 including prisms 24, 26, and 28. A light beam 30 comes from light source 11 of FIG. 1 and impinges on facet 32 of prism 26. Light beam 30 is transmitted by facet 32 and totally internally reflected by facet 34. It then follows the course shown in FIG. 2 and emerges through surface 20. Thus, light is extracted from the interior of lighting element 10.

In a preferred embodiment of lighting element 10 the prisms, such as prisms 24, 26, and 28, form isosceles triangles having an angle of 70.86 degrees. This angle is selected because it causes light traveling at an angle of 9 degrees to the axis of the light fixture to be emitted in a direction normal to that axis if the extraction film is made of polycarbonate. The exact angle selected, however, may vary by as much as five or even ten degrees without significantly affecting the performance of the light fixture and will depend on the position of the light source, its characteristics, and the index of refraction of the extractor film as well as other considerations that may arise in specific situations. Furthermore, although iscoleses prisms are shown, they are not necessary unless the prisms are to be illuminated from both sides. Generally, therefore, it is preferred that the angles be in the range of 59 degrees to 79 degrees.

Figure 3:
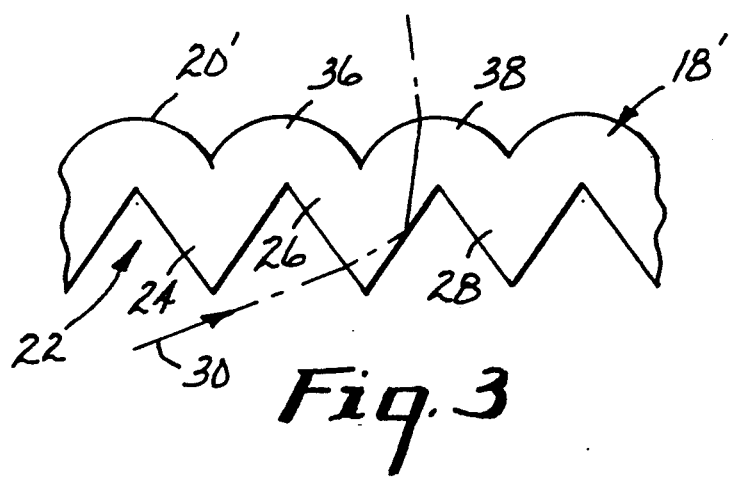
FIG. 3 is an expanded view of an alternative light extractor for use with the invention.

FIG. 3 shows an alternative extractor film 18'. As in the extractor film of FIG. 2, film 18' includes a structured surface 22 having triangular prisms 24, 26, and 28. The outer surface 20' of film 18' has structures 36 and 38 formed thereon. Structures 36 and 38 are simply conventional pillow lenses. Other structures might be provided on the outer surface. Whatever structures are provided thereon would be provided in order to cause the light to have a predetermined desired dispersion characteristic upon escaping the lighting element.

The lighting element of the embodiment of FIG. 1 is optimized to provide relatively uniform light output across the output aperture. As may be seen in FIG. 1, film 18 is smoothly curving over at least a portion of its length. As a result, it cuts through the beam of light coming from lighting element 11 causing portions of extraction film 18 more distant from lighting element 11 to intercept a larger portion of the light beam than do the regions nearer to lighting element 11. In this way it is possible to change the distribution of apparent light intensities across the output aperture. It is even possible for the aperture to appear brighter at the end more distant from lighting element 11 than it is at the end near element 11, although this would be an unusual circumstance. Typically it is desirable to provide reasonably uniform appearing intensity across the entire aperture.

FIG. 4 illustrates a lighting element according to the invention wherein the light source is itself a lighting element according to the invention. In FIG. 4 lighting element 11' includes lamp 40 and film 42. Lamp 40 is a point source with a collimator, preferably a paraboloidal mirror. Film 42 is a structured surface film, preferably of the type shown in FIG. 2. Functionally film 42 converts lamp 40, which acts as a collimated point source, to a collimated line source.

The curvature of film 42 is optimized for collimation of the output beam rather than uniformity of output intensity. In order to design a lighting element to have optimized collimation of its output, the characteristics and the intended positioning of the light source to be used must be known. Given this information, the angle that the film must make with the incoming light may be determined. Typically the angle that the film should make to the light fixture is determined at the center of the film and at points near each end. A curve is then fit to those slopes. The accuracy of this curve may be increased by determining the desired inclination at additional points. In general the resulting curve will not have a constant radius of curvature, but often the deviation is so slight that a constant radius approximation may be used. The curve that the film follows is often symmetric allowing it to be illuminated from both sides.

The system of FIG. 4 utilizes another lighting element according to the invention. In this lighting element, lighting element 11' serves as the light source and film 44 acts as the extractor. As may be seen, film 44 curves down through the path of the beam coming from lighting element 11' to provide uniform illumination. As described above, film 42 effectively changes a point source to a line source. Similarly film 44 effectively uses a line source to produce an area source.

FIG. 5 shows a thin backlit display utilizing two lighting elements according to the invention as light sources. One of these, lighting element 50, includes a lamp 52, a mirror 54, and extraction film 56. Extraction film 56 is one of the type shown in FIG. 2. In a preferred embodiment, mirror 54 makes an angle of 49½ degrees with side 58 of the display. A second lighting element, 60, according to the invention includes another lamp, not shown, mirror 62, and extractor 64. The display further includes an extractor film 66 of the type shown in FIG. 2. The smooth side of FIG. 66 could be provided with graphics to be displayed, or, as is more likely, a graphic-containing medium could be overlaid on the smooth surface of extractor film 66. In order to direct light from the two lighting elements 50 and 60 towards extractor film 66, they make an angle of approximately 81 degrees with the lower surface of the display.

The longer path length obtained by placing lamp 52 to the side of the display makes possible another advantage. If the nominally collimated beam from lamp 52 is actually slightly convergent, the beam will converge to a minimum diameter and then begin to diverge. The minimum beam diameter for a typical lamp used with the invention is between two and three cm. An aperture stop of that size may be placed along the beam path at the location corresponding to the minimum diameter. The aperture stop will block the skew rays, i.e. the rays that are far out of collimation, associated with the beam. This will reduce the uncollimated fraction of the output beam.

We claim:
1. A lighting element comprising:
a housing defining an optical cavity having an optical window;
a light extractor for directing light out of said optical cavity through said optical window, said light extractor having a first side and a second side, said second side having a plurality of linear triangular prisms thereon, each of said prisms having first and second facets, said prisms defining a smooth arcuate curve; and
a light source positioned so as to provide a beam of light traveling at a grazing angle to said second surface of said extractor and approaching said extractor from a first end thereof such that said light will enter each of said prisms through said prism's first facet, be totally internally reflected by said prism's second facet and emerge from said extractor through said first side;
wherein said curve is designed to provide collimated output from said lighting element.
2. A lighting element comprising:
a housing defining an optical cavity having an optical window;
a light extractor for directing light out of said optical cavity through said optical window, said light extractor having a first side and a second side, said second side having a plurality of linear triangular prisms thereon, each of said prisms having first and second facets, said prisms defining a smooth arcuate curve; and
a light source positioned so as to provide a beam of light traveling at a grazing angle to said second surface of said extractor and approaching said extractor from a first end thereof such that said light will enter each of said prisms through said prism's first fact, be totally internally reflected by said prism's second facet and emerge from said extractor through said first side, said light source comprising
a second light extractor for directing light toward said first light extractor, said second light extractor having a first side and a second side, said second side having a plurality of linear triangular prisms thereon, each of said prisms having first and second facets, said prisms defining a smooth arcuate curve; and
a second light source positioned so as to provide a beam of light traveling at a grazing angle to said second surface of said second extractor and approaching said second extractor from a first end thereof such that said light will enter each of said prisms through said prism's first facet, be totally internally reflected by said prism's second facet and emerge from said second extractor through said first side.

3. The lighting element of claim 2 wherein each of said curves is designed to provide collimated output from said fixture.

4. The lighting element of claim 2 wherein each of said curves is designed to provide uniform light output.

5. A lighting element comprising:
 a housing defining an optical cavity having an optical window;
 a light extractor for directing light out of said optical cavity through said optical window, said light extractor having a first side and a second side, said second side having a plurality of linear triangular prisms thereon, each of said prisms having first and second facets;
 a first light source positioned so as to provide a beam of light traveling at a grazing angle to said second surface of said extractor and approaching said extractor from a first end thereof such that said light will enter each of said prisms through said prism's first facet, be totally internally reflected by said prism's second facet and emerge from said extractor through said first side; and
 a second source positioned so as to provide a beam of light traveling at a grazing angle to said second surface of said extractor and approaching said extractor from a second end thereof opposite said first end such that said light will enter each of said prisms through said prism's second facet, be totally internally reflected by said prism's first facet and emerge from said extractor through said first side.

6. A lighting element according to claim 5 wherein said curve is designed to provide collimated output from said fixture.

* * * * *